(12) United States Patent
Gilad et al.

(10) Patent No.: US 11,663,330 B2
(45) Date of Patent: *May 30, 2023

(54) SYSTEMS AND METHODS FOR DISABLING A MALICIOUS ECU IN A CONTROLLER AREA NETWORK (CAN) BUS

(71) Applicant: Red Bend Ltd., Hod Hasharon (IL)

(72) Inventors: Tomer Gilad, Tel-Mond (IL); Shachar Rosen, Tel-Aviv (IL)

(73) Assignee: Red Bend Ltd., Hod Hastiaron (IL)

( * ) Notice: Subject to any disclaimer, the term of this patent is extended or adjusted under 35 U.S.C. 154(b) by 52 days.

This patent is subject to a terminal disclaimer.

(21) Appl. No.: 17/329,618

(22) Filed: May 25, 2021

(65) Prior Publication Data
US 2021/0279331 A1 Sep. 9, 2021

Related U.S. Application Data

(63) Continuation of application No. 16/639,532, filed as application No. PCT/IL2017/050919 on Aug. 17, 2017, now Pat. No. 11,030,310.

(51) Int. Cl.
*G06F 21/55* (2013.01)
*G06F 21/56* (2013.01)
*H04L 12/40* (2006.01)

(52) U.S. Cl.
CPC .......... *G06F 21/554* (2013.01); *G06F 21/566* (2013.01); *G06F 2221/034* (2013.01); *H04L 2012/40215* (2013.01)

(58) Field of Classification Search
CPC ................. G06F 21/554; G06F 21/566; G06F 2221/034; G06F 21/556; G06F 21/577;

(Continued)

(56) References Cited

U.S. PATENT DOCUMENTS 10,462,161 B2 ‡ 10/2019 Carlesimo ............... H04L 12/40
11,030,310 B2 * 6/2021 Gilad ................... G06F 21/577
(Continued)

FOREIGN PATENT DOCUMENTS

CN    102355382 A    ‡    2/2012
CN    102355382 A        2/2012
(Continued)

OTHER PUBLICATIONS

ISA Israel Patent Office, International Search Report and Written Opinion Issued in Application No. PCT/IL2017/050919, dated Dec. 10, 2017, WIPO, 11 pages.‡

(Continued)

*Primary Examiner* — Christopher A Revak
(74) *Attorney, Agent, or Firm* — McCoy Russell LLP

(57) ABSTRACT

There is provided a computer implemented method of disabling a malicious electronic control unit (ECU) of a plurality of ECUs in communication with a controller area network (CAN) bus network, the method executed by a computing device in communication with the plurality of ECUs and the CAN bus network, the method comprising: detecting a malicious message transmitted by the malicious ECU over the CAN bus network, and injecting a plurality of bits over the CAN bus network to trigger a predefined plurality of errors for disabling the malicious ECU before the malicious ECU makes an additional attempt to retransmit an additional instance of the malicious message.

16 Claims, 4 Drawing Sheets

(58) Field of Classification Search
CPC ........... G06F 21/55; H04L 2012/40215; H04L 67/12; H04L 63/1408; H04L 63/1425; H04W 12/122
See application file for complete search history.

(56) References Cited

U.S. PATENT DOCUMENTS

| | | | | |
|---|---|---|---|---|
| 2011/0125855 | A1‡ | 5/2011 | Hartwich | ............ H04L 63/0227 709/206 |
| 2015/0020152 | A1‡ | 1/2015 | Litichever | ............. G06F 21/604 726/1 |
| 2016/0014077 | A1‡ | 1/2016 | Plotnik | ................... H04L 63/10 726/11 |
| 2017/0026386 | A1‡ | 1/2017 | Unagami | ................. H04L 63/14 |
| 2018/0241584 | A1‡ | 8/2018 | Ruvio | ............... H04L 12/40169 |
| 2019/0098047 | A1‡ | 3/2019 | Giannopoulos | ..... H04L 63/1483 |
| 2019/0104149 | A1* | 4/2019 | Zeng | .................. H04L 63/0876 |
| 2020/0204395 | A1‡ | 6/2020 | Takahashi | ............. B60R 16/023 |
| 2020/0387605 | A1 | 12/2020 | Gilad et al. | |
| 2021/0157388 | A1* | 5/2021 | Kulandaivel | ..... H04L 12/40032 |

FOREIGN PATENT DOCUMENTS

| | | | | |
|---|---|---|---|---|
| CN | 106169968 | A | 11/2016 | |
| CN | 106169968 | A ‡ | 11/2016 | ......... G06F 12/1408 |
| CN | 106790053 | A | 5/2017 | |
| CN | 106790053 | A ‡ | 5/2017 | |
| CN | 106919163 | A | 7/2017 | |
| CN | 106919163 | A ‡ | 7/2017 | |
| DE | 102009001377 | A1 ‡ | 9/2009 | ......... H04L 63/0227 |
| DE | 102009001377 | A1 | 9/2009 | |
| EP | 3206361 | A1 ‡ | 8/2017 | ......... G06F 11/0745 |
| EP | 3206361 | A1 | 8/2017 | |
| WO | 2013144962 | A1 | 10/2013 | |
| WO | WO-2013144962 | A1 ‡ | 10/2013 | ........... G06F 21/604 |
| WO | 2017013622 | A1 | 1/2017 | |
| WO | 2017021970 | A1 | 2/2017 | |
| WO | WO 2017/021970 | A1 * | 2/2017 | |
| WO | WO-2017021970 | A1 ‡ | 2/2017 | ....... H04L 12/40078 |
| WO | 2017127639 | A1 | 7/2017 | |
| WO | WO-2017127639 | A1 ‡ | 7/2017 | ............. H04L 12/40 |

OTHER PUBLICATIONS

State Intellectual Property Office of the People's Republic of China, Office Action and Search Report Issued in Application No. 201780093990.X, dated Nov. 2, 2020, 11 pages. (Submitted with Partial Translation).‡

International Bureau of WIPO, International Preliminary Report on Patentability Issued in Application No. PCT/IL2017/050919, dated Feb. 27, 2020, WIPO, 6 pages.‡

Webermann, H. et al., "CAN Error Injection, a Simple but Versatile Approach," ESD Electronics Website, Available Online at https://esd.eu/sites/default/files/CAN_Error_Injection.pdf, Available as Early as Jan. 1, 2012, 6 pages.‡

European Patent Office, Extended European Search Report Issued in Application No. 17921662.7, dated Sep. 22, 2021, Germany, 6 pages.

European Patent Office, Office Action Issued in Application No. 17921662.7, dated May 9, 2022, Germany, 6 pages.

United States Patent and Trademark Office, Office Action Issued in U.S. Appl. No. 16/639,532, dated Nov. 4, 2020, 19 pages.

United States Patent and Trademark Office, Notice of Allowance Issued in U.S. Appl. No. 16/639,532, dated Feb. 5, 2021, 7 pages.

\* cited by examiner
‡ imported from a related application

SYSTEMS AND METHODS FOR DISABLING A MALICIOUS ECU IN A CONTROLLER AREA NETWORK (CAN) BUS

CROSS REFERENCE TO RELATED APPLICATIONS

The present application is a continuation of U.S. National Phase application Ser. No. 16/639,532 entitled "SYSTEMS AND METHODS FOR DISABLING A MALICIOUS ECU IN A CONTROLLER AREA NETWORK (CAN) BUS", and filed Feb. 14, 2020. Application Ser. No. 16/639,532, which claims priority to International Application No. PCT/IL2017/050919 entitled "SYSTEMS AND METHODS FOR DISABLING A MALICIOUS ECU IN A CONTROLLER AREA NETWORK (CAN) BUS", and filed on Aug. 17, 2017. The entire contents of the above-identified applications are hereby incorporated by reference for all purposes.

TECHNICAL FIELD

The present description relates to management of malicious activity and, more specifically, but not exclusively, to management of malicious activity within a controller area network (CAN) bus network, optionally implemented within a vehicle.

BACKGROUND

The last two decades have seen a vast increase in implementation of electronic systems in vehicles. These systems are designed to control and/or monitor many aspect of vehicle operations, for example, engine operations, driving assistance modules, steering control, door opening and locking, speed sensors, light control, safety mechanisms (e.g. ABS brakes, air bags and etc.), and the like. The communication means and software protocols connecting between a vehicle's electronic control units (ECUs) are implemented based on the CAN bus definition. The CAN bus defines the way in which data is transferred between different ECUs.

The ECUs connected according to the CAN bus definition are vulnerable to malicious activity. For example, a hacker with malicious intent may gain control of one or more vehicle features implemented by one or more ECUs via the CAN bus. Further, connecting external communication systems to the vehicle, such as mobile communication, and multimedia networks increase the susceptibility of the vehicle systems to attacks from the outside. A person with malicious intent can interfere with the CAN communication and transmit faulty communication frames or faulty error frames in attempt to change the reaction of at least one ECU. Another vulnerability in entailed in the fact that almost all possible bus messages, their respective structures and communication protocols are specified in publically available documents.

SUMMARY

According to a first aspect, a computer implemented method of disabling a malicious electronic control unit (ECU) of a plurality of ECUs in communication with a controller area network (CAN) bus network, the method executed by a computing device in communication with the plurality of ECUs and the CAN bus network, comprises: detecting a malicious message transmitted by the malicious ECU over the CAN bus network, and injecting a plurality of bits over the CAN bus network to trigger a predefined plurality of errors for disabling the malicious ECU before the malicious ECU makes an additional attempt to retransmit an additional instance of the malicious message.

According to a second aspect, a system for disabling a malicious electronic control unit (ECU) of a plurality of ECUs in communication with a controller area network (CAN) bus network, comprises: a non-transitory memory having stored thereon a code for execution by at least one hardware processor of a computing device in communication with the plurality of ECUs and the CAN bus network, the code comprising: code for detecting a malicious message transmitted by the malicious ECU over the CAN bus network, and code for injecting a plurality of bits over the CAN bus network to trigger a predefined plurality of errors for disabling the malicious ECU before the malicious ECU makes an additional attempt to retransmit an additional instance of the malicious message.

According to a third aspect, a computer program product for disabling a malicious electronic control unit (ECU) of a plurality of ECUs in communication with a controller area network (CAN) bus network, comprises: a non-transitory memory having stored thereon a code for execution by at least one hardware processor of a computing device in communication with the plurality of ECUs and the CAN bus network, the code comprising: instructions for detecting a malicious message transmitted by the malicious ECU over the CAN bus network, and instructions for injecting a plurality of bits over the CAN bus network to trigger a predefined plurality of errors generated for disabling the malicious ECU before the malicious ECU makes an additional attempt to retransmit an additional instance of the malicious message.

The systems, methods, and/or code instructions described herein relate to security for a CAN bus based network (e.g. installed within a road based vehicle) against malicious activity. CAN is designed as a low-level protocol which does not provide its own security and/or its own encryption standards. In particular, relating to preventing further re-transmission of malicious messages on the CAN bus network by a malicious ECU. Embodiments may further relate to reducing the number of bits and/or messages transmitted over the CAN bus network by a computing device for disabling the ECU (e.g., increase an error counter of the malicious ECU above an error threshold such that the malicious ECU enters a Bus-Off state where the malicious ECU is no longer permitted to transmit any data over the CAN bus network).

The systems, methods, and/or code instructions described herein are directed towards detection of malicious activity within the CAN bus network (e.g., installed in a vehicle), for example, malicious code attempting to install itself within a component (e.g., ECU) in communication with the CAN bus network, malicious code attempting to access one or more components (e.g., ECU) in communication with the CAN bus network, and/or manual malicious activity performed by a human via the CAN bus network. The detection of the malicious activity helps maintain a sanitized vehicle network. Detection of malicious activity is a concept inextricably tied to computer technology and/or network technology.

The systems, methods, and/or code instructions described herein improve performance of the vehicle in which the CAN bus network is installed (e.g., prevention of data to the car from the malicious activity, maintaining a safe vehicle), one or more ECUs in communication with the CAN bus network (e.g., preventing damage to the ECU from the malicious activity, preventing increased processor utilization and/or memory due to the malicious activity) and/or the CAN bus network (e.g., preventing a reduction in network performance, and/or a reduction in available bandwidth, and/or an increase in data transmission time due to the malicious activity). The improvement in performance results by maintenance of the sanitized CAN bus network and/or sanitized ECUs. ECUs(s) and/or the CAN bus network adversely affected by malicious activity may experience degradation in processor performance, reduced available memory, degradation in network performance and/or available network bandwidth.

In particular, as described herein in additional detail, the systems, methods, and/or code instructions described herein prevent the malicious ECU from re-transmitting the malicious message over the CAN bus network before the malicious ECU is disabled from transmission of data over the CAN bus network (e.g., the status of the malicious ECU is changed to Bus Off). For example, based on other methods described below in additional detail, each transmission of the malicious message by the malicious ECU over the CAN bus network triggers injection of an error (e.g., bit stuffing error) by the mitigating ECU (and/or other computing device). The injected error triggers the malicious ECU to send an error flag, and increase the value of the transmit error counter of the malicious ECU (e.g., by 8) for each injected error. The systems, methods, and/or code instructions described herein prevent the process of iterating the re-transmission of the malicious message and re-injection of the error, before a re-transmission of the malicious message, by triggering multiple errors in the malicious ECU such that the malicious ECU is disabled.

The reduction in re-transmission of the malicious messages reduces the risk that one of the re-transmitted malicious messages evades detection and is able to maliciously affect one or more ECUs and/or other vehicle components.

The systems, methods, and/or code instructions described herein improve performance of the vehicle itself, by maintaining a sanitized network not adversely affected by malicious activity. The vehicle with the sanitized network is able to perform correctly, providing features as designed, for example, safety features, and/or road navigation features. Vehicles adversely affected by malicious activity may malfunction, potentially resulting in vehicle failure, accidents, and navigation errors.

In a further implementation form of the first, second, and third aspects, a current error count value stored by at least one error counter of the malicious ECU is increased above an error threshold denoting disabling of the malicious ECU in response to the triggered predefined plurality of errors In a further implementation form of the first, second, and third aspects, a difference between the current error count value and the error threshold is greater than the value by which the error counter increases the current error count value in response to a single generated error.

In a further implementation form of the first, second, and third aspects, the predefined number of the plurality of errors is computed according to the error threshold value divided by the amount of increase of the current error count value in response to generating a single error.

In a further implementation form of the first, second, and third aspects, the predefined number of the plurality of errors is 32 when the error threshold value is 255 and when the current transmit error count value is increased by 8 in response to generating a single error.

In a further implementation form of the first, second, and third aspects, the injected bits are designed to trigger one or more of the following errors, selected from the group consisting of: bit stuffing, bit error, cyclic redundancy check (CRC), monitoring, frame, and acknowledgement errors.

In a further implementation form of the first, second, and third aspects, the predefined number of the plurality of errors are triggered by a plurality of injection sessions, wherein each bit injection session is triggered in response to detection of an additional error.

In a further implementation form of the first, second, and third aspects, a first injection session of the plurality of injection sessions comprises injecting bits to trigger a first error and transmission of a first error flag, wherein a current error count value stored by at least one error counter of the malicious ECU is increased by the transmission of the first error flag, and the method further comprises and/or the system further includes code for and/or the computer program product includes additional instructions for interrupting the error frame storing the first error flag and injecting bits as an additional bit injection session for manipulating the form of the error frame to trigger a form error, wherein the form error triggers transmission of another error flag which triggers another increase of the current error count value stored by the at least one error counter of the malicious ECU, iterating the interrupting of an additional error frame and the injection of bits as an additional bit injection session for manipulating the form of the error frame, to trigger at each iteration the transmission of a form error form and a respective increase of the current error count value, wherein the number of iterations are performed accordingly to generate the predefined number of the plurality of errors for disabling the malicious ECU.

In a further implementation form of the first, second, and third aspects, manipulating the form of the error frame comprises transmitting a single dominant bit in place of the expected at least one recessive bit of an error delimiter field of the error frame.

In a further implementation form of the first, second, and third aspects, the last iteration of the interrupting the error frame is performed without the manipulating the form of the error frame.

In a further implementation form of the first, second, and third aspects, the first error comprising a stuff error, and 6 dominant bits are injected to trigger the stuff error.

In a further implementation form of the first, second, and third aspects, the injecting the plurality of bits comprises injecting the plurality of bits in a single session as a consecutive streaming of dominant bits of: a first predefined number of consecutive dominant bits, and injecting a second predefined number of consecutive sets each of a third predefined number of dominant bits, followed by a fourth predefined number of valid bits of a recessive delimiter and a fifth predefined number of recessive bit intermission.

In a further implementation form of the first, second, and third aspects, the first predefined number of consecutive dominant bits comprises 14 dominant bits, the second predefined number of consecutive sets comprises 31 consecutive sets, the third predefined number of dominant bits comprises 8 dominant bits, the fourth predefined number of valid bits comprises valid 8 bit recessive delimiter, and the fifth predefined number of recessive bit intermission comprises 3-bit recessive intermission.

In a further implementation form of the first, second, and third aspects, a current error count value stored by at least one error counter of the malicious ECU is increased from 0 to 256.

In a further implementation form of the first, second, and third aspects, in response to the malicious ECU detecting the first predefined number of consecutive dominant bits, and in response to detecting each sequence of the second predefined number of the additional third predefined number of consecutive dominant bits, a current error count value stored by at least one error counter of the malicious ECU is increased.

In a further implementation form of the first, second, and third aspects, the first predefined number of consecutive dominant bits are detected by the malicious ECU after transmission of an active error flag.

In a further implementation form of the first, second, and third aspects, the first predefined number of consecutive dominant bits are detected by the malicious ECU after detecting a sixth predefined number of consecutive dominant bits following a passive error flag.

In a further implementation form of the first, second, and third aspects, the sixth predefined number of consecutive dominant bits denotes the 8th consecutive dominant bit following the passive error flag.

In a further implementation form of the first, second, and third aspects, the malicious ECU, the CAN bus network, the plurality of ECUs, and the computing device are implemented in a vehicle.

In a further implementation form of the first, second, and third aspects, the computing device is implemented as an independent component in communication with the malicious ECU and the CAN bus network.

In a further implementation form of the first, second, and third aspects, the computing device is implemented as one or more of the plurality of ECUs with the code instructions installed on a local memory of the respective one or more of the plurality of ECUs for execution by the hardware processor of the respective one or more of the plurality of ECUs.

Unless otherwise defined, all technical and/or scientific terms used herein have the same meaning as commonly understood by one of ordinary skill in the art to which some embodiments pertains. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE FIGURES

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

DETAILED DESCRIPTION

Figure 1:
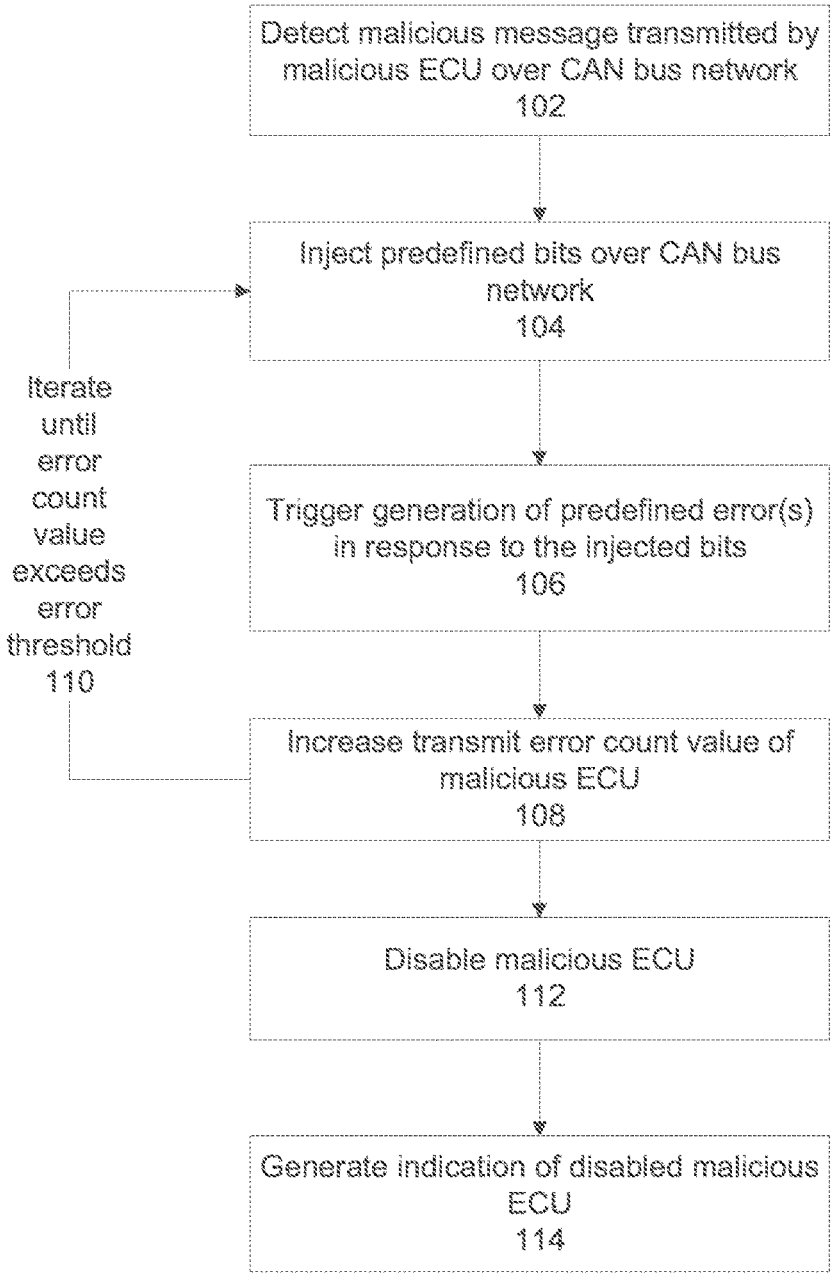
FIG. 1 is a flowchart of a method of disabling a malicious ECU in communication with a CAN bus network and one or more other ECUs, in accordance with some embodiments.

Some embodiments relate to management of malicious activity and, more specifically, but not exclusively, to management of malicious activity within a controller area network (CAN) bus network, optionally implemented within a vehicle.

An aspect of some embodiments relate to systems, an apparatus, methods, and/or code instructions (stored in a data storage device, executable by one or more hardware processors) for disabling a malicious ECU when a malicious message(s) transmitted by the malicious ECU over a CAN bus network is detected. The malicious ECU is disabled by a computing device (e.g., mitigating ECU) that transmits a predefined sequence of bits over the CAN bus network. A predefined number of errors are generated in response to the injected bits. In response to the generated predefined number of errors, the malicious ECU is disabled from transmission of data over the CAN bus network. The predefined number of errors exhaust the malicious ECU retransmission mechanism. The malicious ECU is disabled before the malicious ECU makes an additional attempt to retransmit additional instance(s) of the malicious message.

Optionally, the value of a transmit error counter of the malicious ECU is increased in response to the errors generated by the ECU, to a value above an error threshold. The malicious ECU is prevented from transmission of malicious data (and data in general) over the CAN bus when the transmit error counter value is raised above the error threshold.

Apart from the first instance of the malicious message (which is detected and triggers the process of disabling the malicious ECU), no additional instances of the malicious messages are transmitted by the malicious ECU. The malicious ECU is disabled from data transmission over the CAN bus network before the malicious ECU is able to transmit another instance of the malicious message.

The computing device injects bits selected to trigger two or more errors generated by the malicious ECU, which disable the malicious ECU when the difference between the current value of the error counter and the error threshold is greater than the value by which the error counter is incremented in response to a single generated error.

Optionally, the predefined number of errors are generated as multiple injection sessions. Each bit injection session is triggered in response to detection of an additional error flag. Bits are injected (e.g., 6 dominant bits) to trigger a first error (e.g., stuffing error) (at least by the malicious ECU) and trigger transmission of a first error flag (at least by the malicious ECU). In response to the generated errors, the value of the transmit error counter of the malicious ECU is increased (e.g., by 8). The computing device interrupts the error frame storing the first error flag transmitted by the malicious ECU, and the computing device manipulates the form of the error frame, by injection of an additional bit injection session, to trigger a form error by the malicious ECU. The form error triggers transmission of another error flag by the malicious ECU. The transmission of another error flag triggers another increase of the transmit error counter of the malicious ECU. The interruption of the error frame and the manipulation of the form of the error frame to trigger the error form transmission by the malicious ECU are iterated a predefined number of times, to trigger the predefined number of errors by the malicious ECU, which accordingly increment the value of the error counter above the error threshold, for disabling the malicious ECU from further transmission over the CAN bus network. It is noted that the malicious ECU is only able to transmit the malicious message once over the CAN bus network before being disabled from further data transmission over the CAN bus network.

Alternatively or additionally, bits are injected in a single session as a consecutive streaming of dominant bits. A first predefined number of consecutive dominant bits (e.g., 14) are injected, followed by the injection of a second predefined number of consecutive sets (e.g., 31) each of a third predefined number of dominant bits (e.g., 8), followed by injection of a fourth predefined number of valid bits of a recessive delimiter (e.g., 8) and an injection of a fifth predefined number of recessive bit intermission (e.g., 3). The sequence of bits is designed to trigger the predefined number of errors generated by the malicious ECU and trigger raising of the error count value of the malicious ECU above the threshold, disabling the malicious ECU. The malicious ECU is disabled before the malicious ECU is able to re-transmit the malicious message over the CAN bus network.

The systems, methods, and/or code instructions described herein relate to security for a CAN bus based network (e.g. installed within a road based vehicle) against malicious activity. CAN is designed as a low-level protocol which does not provide its own security and/or its own encryption standards. In particular, relating to preventing further re-transmission of malicious messages on the CAN bus network by a malicious ECU. Embodiments may further relate to reducing the number of bits and/or messages transmitted over the CAN bus network by a computing device for disabling the ECU (e.g., increase an error counter of the malicious ECU above an error threshold such that the malicious ECU enters a Bus-Off state where the malicious ECU is no longer permitted to transmit any data over the CAN bus network).

The systems, methods, and/or code instructions described herein improve an underlying process within the technical field of security of CAN bus based networks, in particular, within the technical field of security of CAN bus based networks installed within vehicles.

The systems, methods, and/or code instructions described herein are directed towards detection of malicious activity within the CAN bus network (e.g., installed in a vehicle), for example, malicious code attempting to install itself within a component (e.g., ECU) in communication with the CAN bus network, malicious code attempting to access one or more components (e.g., ECU) in communication with the CAN bus network, and/or manual malicious activity performed by a human via the CAN bus network. The detection of the malicious activity helps maintain a sanitized vehicle network. Detection of malicious activity is a concept inextricably tied to computer technology and/or network technology.

The systems, methods, and/or code instructions described herein improve performance of the vehicle in which the CAN bus network is installed (e.g., prevention of data to the car from the malicious activity, maintaining a safe vehicle), one or more ECUs in communication with the CAN bus network (e.g., preventing damage to the ECU from the malicious activity, preventing increased processor utilization and/or memory due to the malicious activity) and/or the CAN bus network (e.g., preventing a reduction in network performance, and/or a reduction in available bandwidth, and/or an increase in data transmission time due to the malicious activity). The improvement in performance results by maintenance of the sanitized CAN bus network and/or sanitized ECUs. ECUs(s) and/or the CAN bus network adversely affected by malicious activity may experience degradation in processor performance, reduced available memory, degradation in network performance and/or available network bandwidth.

In particular, as described herein in additional details, the systems, methods, and/or code instructions described herein prevent the malicious ECU from retransmitting the malicious message over the CAN bus network before the malicious ECU is disabled from transmission of data over the CAN bus network (e.g., the status of the malicious ECU is changed to Bus Off). For example, based on other methods described below in additional detail, each transmission of the malicious message by the malicious ECU over the CAN bus network triggers injection of an error (e.g., bit stuffing error) by the mitigating ECU (and/or other computing device). The injected error triggers the malicious ECU to send an error flag, and increase the value of the transmit error counter of the malicious ECU (e.g., by 8) for each injected error. The systems, methods, and/or code instructions described herein prevent the process of iterating the re-transmission of the malicious message and re-injection of the error, before a re-transmission of the malicious message, by triggering multiple errors in the malicious ECU such that the malicious ECU is disabled.

The reduction in retransmission of the malicious messages reduces the risk that one of the retransmitted malicious messages evades detection and is able to maliciously affect one or more ECUs and/or other vehicle components.

The systems, methods, and/or code instructions described herein improve performance of the vehicle itself, by maintaining a sanitized network not adversely affected by malicious activity. The vehicle with the sanitized network is able to perform correctly, providing features as designed, for example, safety features, and/or road navigation features. Vehicles adversely affected by malicious activity may malfunction, potentially resulting in vehicle failure, accidents, and navigation errors.

The systems, methods, and/or code instructions described herein are tied to physical real-life components, including ECUs, the physical medium providing data transfer of the CAN bus network, the hardware processor(s) of the computing device described herein, and the memory storing code instructions for execution by the hardware processor(s).

The systems and/or methods described herein provide a unique, particular, and advanced technique of preventing future transmissions of malicious messages by a malicious ECU over the CAN bus network.

Accordingly, the systems and/or methods described herein are inextricably tied to a network environment and/or to computer technology installed within vehicles.

Before explaining at least one embodiment in detail, it is to be understood that the embodiment(s) is not necessarily limited in its application to the details of construction and the arrangement of the components and/or methods set forth in the following description and/or illustrated in the drawings and/or the Examples. Other embodiments are capable of being practiced or carried out in various ways.

Embodiments may be a system, a method, and/or a computer program product. The computer program product may include a computer readable storage medium (or media) having computer readable program instructions thereon for causing a processor to carry out aspects.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects.

Aspects are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the terms malicious ECU refers to one or more ECUs that transmit a malicious message. For clarity, the case of a single malicious ECU is described. Multiple malicious ECUs may be disabled based on the systems and/or methods described with reference to the single malicious ECU case. means the certain ECU is identified as the malicious ECU.

As used herein, the term malicious message refers to malicious data transmitted over the CAN bus, for example, a frame, which conforms to the CAN bus definitions. The malicious message may include, for example, the base frame format (11 bits ID) and/or the extended frame format (29 bits ID made up of the 11-bit identifier (i.e., base identifier) and/or an 18-bit extension (identifier extension). The term malicious message may include one or more of the following exemplary frame types: data frame: a frame containing node data for transmission, remote frame: a frame requesting the transmission of a specific identifier, error frame: a frame transmitted by any node detecting an error, and overload frame: a frame to inject a delay between data and/or remote frame. The malicious message may be generated by automatic malicious activity performed by malicious code, and/or manual malicious actions performed by a human (e.g., hacker, thief, terrorist). Examples of malicious code include viruses, worms, Trojan horse, spyware, adware, cryptoware, and ransomware. Malicious code may be installed as executable code, a script, an application, a file, by injection, by manual coding, and/or other methods. Examples of manual malicious actions include manual tampering with existing data, installation of forged or fake data instead of real recorded sensor data, and installation of malicious code.

Additional details of error handling by ECUs according to the CAN bus definition is now described:

The term CAN, Controller Area Network, may refer to a controller network with a frame based protocol, for communication between devices without a host computer. CAN may further provide a multi-master redundant network, operating even if some of the nodes are not functioning. CAN frames are not necessarily associated with a recipient address but are classified over their identifier. As a consequence, CAN controllers may broadcast their frames to all connected nodes when all connected nodes decide independently whether to further process the received frames. CAN communication may apply a decentralized priority driven access control methods to guarantee the transmission of a top priority frame first and an error detecting mechanism that can detect errors and interrupt communication. Further the term CAN may include, but is not necessarily limited to, event triggered CAN bus, time triggered CAN bus, multimedia connected CAN bus, wireless connected CAN bus, or local small autonomous network such as LIN (local interconnected network) bus. Each message sent between two network devices may be subdivided into packets comprising units of binary data being communicated through a computer network by the underlying hardware and software. Depending on the protocol, packets may be constructed in some standard format determining their boundaries, origin and destination. Packets may be encapsulated into frames in the data link layer so that they can be transferred over different media to the end destination. The term frame may interchangeably refer hereinafter to a message format that is communicated in a CAN network. This includes, for example, both the base frame format (11 bits ID) and the extended frame format (29 bits ID made up of the 11-bit identifier (base identifier) and an 18-bit extension (identifier extension). Additionally or alternatively, the term may further include one or more of the following frame types: data frame: a frame containing node data for transmission; remote frame: a frame requesting the transmission of a specific identifier; error frame: a frame transmitted by any node detecting an error; and, overload frame: a frame to inject a delay between data and/or remote frame.

Error in a CAN network may occur in the bit level and/or at the frame level. These errors may include, for example, cyclic redundancy check (CRC), bit error, bit stuffing, monitoring, frame, and acknowledgement errors. When an ECU detects an error, it will immediately abort the transmission and broadcast an error frame including an error flag made up of a bit string that violates the bit stuffing rule, all other ECUs will respond by transmitting error flags too. Following a sufficient number of errors, an ECU will eventually switch to bus off state.

Errors may be divided into transmission errors and receiving errors. In a vehicle it may be vital to know whether the errors are transient (such as due to noise, electrical surges, or any temporary condition) or permanent due to failure of the node due to defective hardware. Consequently each node (ECU) includes one or more error counters, keeping track of the number of errors transmitted and received. Typically, the error count can affect the status of the ECU as follows:

Each ECU (i.e., node) is configured, according to the CAN bus definition, to operate in one of the three states: error active, error passive and bus off. The terms active and/or passive refer to the type of error frame that the node is allowed to send if it had detected an error. An error active status indicates that, the node is fully functional. The node is active on the network and can transmit Error Active frames. When the node is in Error Active state then whenever it detects an error it can interrupt the transmission by sending an Error Active frame. An Error Active frame comprises six dominant (i.e. 0s) bits which override what is currently being transmitted on the bus. It interrupts the current transmission and all the nodes on the bus including the transmitter are aware that an error was detected.

Unlike Error Active, when the node is in error passive status mode, the node is restricted from sending an Error Active frames (according to the CAN bus definition). This means that if the node detects an error then it can send an Error Passive frame which consists of 6 recessive (i.e. 1's) bits. Since the recessive bits do not interrupt the transmission then the transmitting node may continue its transmission without interruption. Other than the difference in the type of Error frame that the node is allowed to send, there are no additional significant differences and the node can transmit normal frames like any other node on the bus. Error counts above as a non-limiting example 255, will cause the node to enter a bus-off mode, without transmission on the bus.

Typically, receive errors raise the error count by one (or another predefined number) and transmit errors raise the count by eight (or another predefined number). Error free messages lower the count by one (or another predefined number).

When the error count returns to zero normal activity is resumed. When in offline mode, a node in the bus off (offline) condition configures a predetermined number of consecutive recessive bits have been monitored. If a node is detecting an error while it is transmitting a normal frame (either that it detected the error by itself or some other node transmitted an Error Active frame and interrupted its transmission) it then increases the error count by 8 (TX_ERROR_COUNTER=TX_ERROR_COUNTER+8). When the error counter crosses the 127 level (128 and above) it changes from Error Active to Error Passive state. When the error counter reaches 256 then the node is switched to Bus-Off state and is no longer allowed to transmit any messages.

When the node is not in Bus-Off then every successful transmission of a normal frame causes the error counter to be decreased by 1 (or another predefined value). This allows the node to recover back to Error Active state in case there are no more problems caused by this node's transmissions.

Additional details of error handling by ECUs according to the CAN bus definition may be found, for example, with reference to International Patent Application Publication No. WO 2017/021970 by Guy Ruvio et al., "Means and Methods for Regulating CAN Communication", incorporated by reference herein in its entirety.

Further details of the addressed technical problem and the technical solution are now discussed in detail. Another method is discussed to highlight the addressed technical problem. The method is implemented within an environment that includes multiple ECUs communicating with one another via a CAN bus, optionally installed in a vehicle. The other method operates as follows:

When a malicious message transmitted by one of the ECUs (referred to as a malicious ECU) is detected (e.g., by a computing device, optionally implemented as an ECU, referred to as a mitigation ECU) by the mitigation ECU, the mitigation ECU injects 6 dominant bits onto the CAN bus network. The 6 dominant bits (i.e. 0's) denote an error active frame transmitted by an ECU that detected an error on the CAN bus network, as defined by the CAN bus definitions. The 6 dominant bits override what is currently being transmitted on the CAN bus, and trigger the malicious ECU to abort transmission of the malicious message.

When the malicious ECU detects a bit error (at the latest at the sixth injected 0 bit), the malicious ECU transmits an error flag at the next bit. The error flag includes a stream of bits that violates a bit stuffing rule. When the malicious ECU successfully transmits the error flag, the malicious ECU increases the value of its transmit error counter (TransmitErrorCounter) by 8.

When other ECUs (i.e., non-malicious ECUs) detect the bit stuffing error transmitted by the mitigation ECU, they discard the malicious message transmitted by the malicious ECU.

Other ECUs that recognize the initial injected error transmitted by the mitigation ECU (i.e., the 6 dominant bits) each transmit a respective error flag and/or echo error flag that are expected to be followed by an error delimiter field which includes 8 recessive bits (i.e., 1's) followed by 3 intermission recessive bits, after which the CAN bus becomes idle.

The malicious ECU, which failed to transmit the malicious message, attempts to retransmit the malicious message as soon as the CAN bus becomes idle, and according to prioritization.

The process is iterated, as the mitigating ECU detects the re-transmitted malicious message, and re-transmits the injected 6 dominant bits onto the CAN bus network. The malicious ECU increases the value of the transmit error counter by an additional 8, in response to successfully transmitting another error flag. The process is iterated until the value of the transmit error counter rises above a predefined threshold (e.g., 255), which triggers the malicious ECU into enter the Bus Off state, during which no additional attempts to transmit the malicious message are made.

The technical problem addressed herein relates to the fact that the automatic retransmission mechanism defined by the CAN bus definitions is designed for re-transmission of legitimate messages that the ECU failed to transmit, for example, due to external interference, excessive noise on the bus, or other reasons. The technical problem arises when malicious messages are being re-transmitted (which should be stopped and not re-transmitted) rather than legitimate messages (which should actually be re-transmitted). A malicious message that is detected and discarded is handled according to the CAN bus definition, as if the transmission of the malicious message has failed, and the re-transmission mechanism, following the CAN bus definition, re-transmits the malicious message. To fully prevent additional attempts at re-transmission of the malicious message, the malicious ECU is prevented from additional transmission of data over the CAN bus by increasing the value of the error counter above the threshold. However, when the threshold is 255, and the initial value of the error counter is zero, 32 attempts at re-transmission of the same malicious message need to be successfully prevented to cause the malicious ECU's error counter to be above the threshold, to disable the malicious ECU from further re-transmissions of the malicious message.

Other technical issues that may arise that are related to the technical problem include one or more of:

Preventing 32 attempts at transmission of the malicious message presents a risk that one of the malicious messages goes undetected by the mitigation ECU, and is able to reach its destination, resulting in malicious activity.

As each re-transmission of the malicious message by the malicious ECU is subject to repeated arbitration, a situation may arise in which other legitimate messages win the arbitration, delaying the re-transmission of the malicious message, making it more difficult to detect the malicious messages and/or differentiate the malicious message from the transmitted legitimate message.

The mechanism of repetitive re-transmission may affect transmission of new authentic frames (i.e., legitimate data) by a legitimate ECU with the same identification (ID) as the malicious ECU, since transmission of data over the CAN bus is based on ID. For example, the malicious ECU may maliciously use the ID of a legitimate ECU in an attempt to pose as the legitimate ECU.

The time required to complete the entire retransmission process (i.e., 32 preventions of the re-transmission of the malicious message) is significant. For example, a cycle prevention of retransmission of the malicious message is based on transmission of 30 bits: start of frame (1 dominant bit)+ID (11 bits)+RTR (1 recessive bit)+Error Flag (6 dominant bits)+Error Delimiter (8 recessive bits)+intermission (3 recessive bits). For 32 cycles, the total number of transmitted bits is 960. For an exemplary processing rate of 2 microseconds per bit, the total processing time becomes significant.

Figure 2:
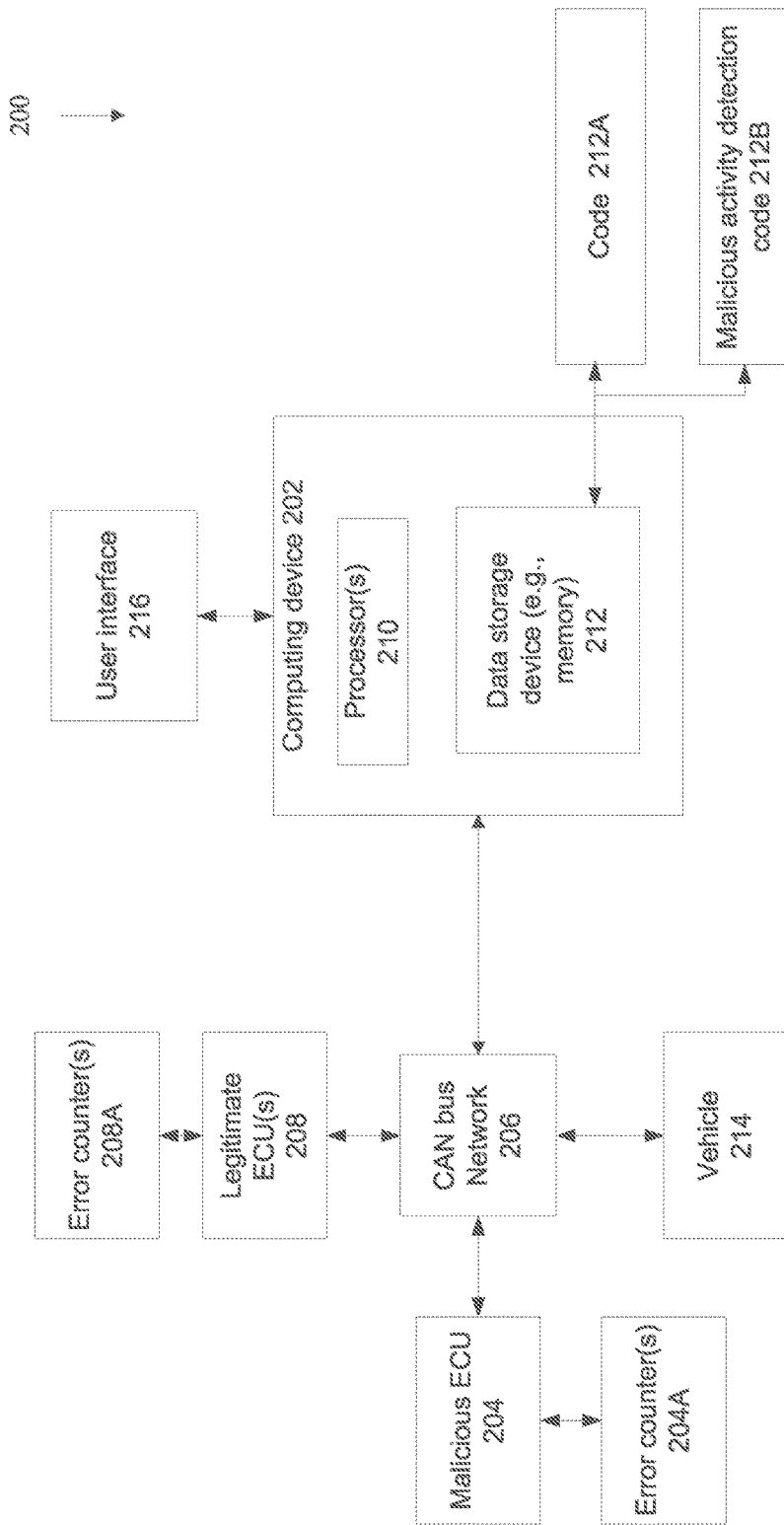
FIG. 2 is a block diagram of components of a system that includes a computing unit that disables a malicious ECU in communication with a CAN bus network and one or more legitimate ECUs, in accordance with some embodiments.

Reference is now made to FIG. 1, which is a flowchart of a method of disabling a malicious ECU in communication with a CAN bus network and one or more other ECUs, in accordance with some embodiments. The malicious ECU is disabled in response to detection of one or more malicious messages (e.g., data transmitted within frame(s)) transmitted over the CAN bus network by the malicious ECU. Reference is also made to FIG. 2, which is a block diagram of components of a system 200 that includes a computing unit 202 that disables a malicious ECU 204 in communication with a CAN bus network 206 and one or more legitimate ECUs 208, in accordance with some embodiments. Computing unit 202 may implement the acts of the method described with reference to FIG. 1, by one or more hardware processors 210 executing code instructions 212A stored in a data storage device 212 (also referred to as a program store, and/or memory).

Computing device 202 may be installed within a vehicle 214, optionally a road based vehicle, for example, a car, a truck, a van, a minivan, and a bus. The vehicle may be an autonomously driven vehicle, a manually driven vehicle, or a semi-autonomous semi-manual driven vehicle.

Computing device 202 may be referred to herein as a mitigating ECU.

Computing device 202 may be implemented, for example, as a hardware component (e.g., installed in vehicle 214), as code instructions installed on one or more existing ECUs where the code instructions are executed by the hardware processor(s) of the existing ECU, as a portable computing unit that may be used for other purposes, for example, a mobile device (e.g., Smartphone, tablet computer, laptop computer, glasses computer, and watch computer), and/or as an external computing device (e.g., server) location outside of the vehicle in wireless communication with CAN bus network 206. Computing device 202 may be installed as an integrated component within vehicle 214, as a removable component of vehicle 214, and/or as an external component to vehicle 214.

Processor(s) 210 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 210 may include one or more processors (homogenous or heterogeneous), which may be arranged for parallel processing, as clusters and/or as one or more multi core processing units, for example, distributed across multiple virtual and/or physical servers, for example, located within a computing cloud and/or at multiple network connected processing nodes.

Data storage device 212 store code instructions 212A-B executable by processor(s) 210. Data storage device 212 is implemented as, for example, a random access memory (RAM), read-only memory (ROM), and/or a storage device, for example, non-volatile memory, magnetic media, semiconductor memory devices, hard drive, removable storage, and optical media (e.g., DVD, CD-ROM). It is noted that one or more features implemented by code instructions 212A-B may be implemented in hardware and/or firmware.

Computing device 202 includes and/or is in communication with one or more user interfaces 216 (which may be integrated with a display installed in the vehicle, and/or be implemented as a separate device for example, as the user interface of the mobile device of the user), for example, a touchscreen, a keyboard, a mouse, and voice activated software using speakers and microphone. User interface 216 may include a graphical user interface (GUI) presented on the display. User interface 216 may include a mechanism (e.g., the GUI) designed for a user to enter data (e.g., configuration parameters) and/or for a user to view data (e.g., view disabled ECU event).

Malicious ECU(s) 204 includes one or more ECUs of vehicle 214 that communicate via CAN bus network 206. ECU(s) 204 is identified as a malicious ECU according to detection of a malicious message transmitted over CAN bus network 206, optionally by malicious activity detection code 212B. ECUs operating normally and transmitting legitimate messages (which may have errors, however are not identified as malicious) are denoted herein as legitimate ECU(s) 208. Each of malicious ECU(s) 204 and legitimate ECU(s) are respectively associated with an error counter(s) 204 and error counter 208A. Error counter(s) 204 may include a transmit and/or receive error counter, according to the CAN bus definition.

Exemplary ECUs 204 and 208 include one or more of: a transmission control unit (TCU) that controls the transmission of vehicle 214 according to data, one or more sensors, components that controls one or more of the electrical system or subsystems in the vehicle.

CAN bus network 206 may be implemented as a hardware bus, a physical network, and/or a wireless network. CAN bus network 206 transmits data based on broadcasting by the connected ECUs, according to the CAN bus definitions. It is noted that CAN bus network 206 may be in communication with and/or integrated with one or more other networks through which a malicious entity (e.g., human, malicious code) accesses malicious ECU 204. Such other networks may connect different electronic and/or computing components within the vehicle, and/or connect computing components of the vehicle to externally located computing devices (e.g., using a wireless connection and/or wired connection). Exemplary networks include: canvas, can-fd, flexray, and Ethernet.

Referring now back to FIG. 1, at 102, a malicious message transmitted by malicious ECU 204 over CAN bus network 206 is detected by computing device 202 (and/or another computing device and/or ECU) executing malicious activity detection code 212B.

The malicious message may be detected based on detection of one or more anomalies. Anomaly (i.e., malicious message) detection may be based on identification of one or more of: items, events, patterns, observations which are incompatible and/or dissimilar and/or do not conform to a previously defined or expected event, event duration, event frequency, pattern or observation in a data set. Additionally or alternatively, the comparison may be to a statistical expected value, to a range of defined values and/or one or more predefined exact values. The comparison may further refer to, for example one or more of, exceptions, peculiarities, surprise, noise, novelties, outliers and the like of one data compared to another. Additionally or alternatively, the anomaly detection is performed as one or more of: unsupervised anomaly detection, supervised anomaly detection, semi-supervised anomaly detection, and any combination thereof. Supervised anomaly detection may be based on exiting normal data labels and anomalies data labels. Semi-supervised anomaly detection may be based on the occurrence of a limited amount of labeled data in the process of detection. For example, the creation of a model based on the limited data set followed by testing the statistical significance of a test instance to be generated by the model. Unsupervised anomaly detection—No data labels available, is based on the relatively low occurrence of abnormal data characteristics. Additionally or alternatively, the anomaly is a point anomaly, contextual anomaly, structural anomaly, collective anomaly, and any combination thereof. Additionally or alternatively, statistical means are employed to examine the occurrence of an anomaly and to try and determine whether its occurrence is a stochastic process, has a certain degree of probability, whether it is a time and/or activity related event. Additionally or alternatively, anomaly may refer to a divergence from a possibility probability matrix generated (predefined and/or self-learned, and or updated) to predict at least one event such as the probability of a target frame to follow another frame, each having its own defined characteristics and/or their relative values have a target characteristic and/or their connection provides a related characteristic. Additionally or alternatively, the anomaly detection compares at least one of: one or more bit content, arbitration field content, control bit content, data bit content, CRC field content, at least one frame, at least one message comprised of a plurality of frames, at least one frame characteristic, at least one frame relation characteristic, and any combination thereof.

Alternatively or additionally, the malicious message may be detected by detecting a message transmitted in response to an attack. The term attack in reference to an attack originator may refer herein to any attempted damage, unauthorized use or unauthorized access to bus communication or any connected ECU. This includes, as non-limiting examples: Unauthorized use of at least one ECU, unauthorized access to a communication; Communication timing attacks—such as delaying at least one communication packet/frame, changing the order of forwarding at least one communication packets/frame; Information attacks—leaking of at least a portion of information, false representation of at least a portion of the data, disruption, change, erasing at least a portion of the packet format, or information, changing the origin or destination of at least a portion of the communication, creating false communication, copying at least a portion of the information communicated, sending false validations; configuration attacks—such as false software update, false change in configuration, changing the access control, attacks against at least one ECU—such as preventing at least one ECU from operating normally or operating at all, propagation of malicious code (e.g. virus or worm); physical attacks—such as forcing rebooting, re-flashing booting modified software, attack on the core network—such as traffic tunneling between impersonated devices, using a rogue device, submitting multiple requests in an intention to overload the network and or the ECU; user data and identity attacks—such as impersonation of a device, retrieval of information of a specific user or a specific ECU, changing the access of users to the system, and combinations of the aforementioned.

Additional details of detection of malicious messages may be found, for example, with reference to International Patent Application Publication No. WO 2017/021970 by Guy Ruvio et al., "Means and Methods for Regulating CAN Communication", incorporated by reference herein in its entirety.

At 104, computing device 202 injects predefined bits over CAN bus network 206. The injected bits may include the ID of malicious ECU 204. The predefined bits may be dominant bits that override data currently being transmitted over CAN bus network, optionally overriding the malicious message transmitted by malicious ECU 204 and/or overriding other error messages transmitted by the malicious ECU in response to previously injected bits (during iterations according to arrow 110).

The injected bits are designed to trigger one or more of the following errors by malicious ECU 204: bit stuffing, cyclic redundancy check (CRC), monitoring, frame, and acknowledgement.

At 106, one or more errors are generated in response to receiving the predefined injected bits. The errors may be generated by malicious ECU 204, by computing device 202, and/or by another ECU 208. Error message(s) indicative of the generated error(s) may be transmitted over CAN bus network 206.

The bits may be injected according to a set-of-rules defining a target data state of the CAN bus network. The target data state of the CAN bus network denotes a target state of the data currently transmitted on the CAN bus network, and/or a history of a sequence of transmissions of data on the CAN bus network. A predefined number of errors are detected by the malicious ECU in response to the bits that are transmitted based on the set-of-rules.

The generated errors are selected and/or predefined according to the bits injected by computing device 202.

The bits may be injected, for example, in a single session as a consecutive streaming of dominant bits, and/or in multiple bit injection sessions where each bit injection session is triggered in response to detection of an additional error.

At 108, a current transmit error count value stored by error counter(s) 204A of malicious ECU 204 is increased in response to generation of the error (s), according to the CAN bus definitions.

At 110, one or more of acts 104-108 may be iterated, to increase the transmit error count value above an error threshold value. Each error generated by malicious ECU 204 in response to the bits injected by computing device 202 increases the value of the transmit error count stored by error counter 204A accordingly. The injected bits may be selected and/or adjusted by computing device 202 according to the error message(s) transmitted by malicious ECU 204.

The difference between the current error count value (i.e., the initial value of error counter 204A of malicious ECU 204 when the malicious message is first detected) and the error threshold is greater than the value by which transmit error counter 204A increases the current transmit error count value in response to a single generated error. For example, the difference between the current error count value and the threshold is greater than 8, which is the value by which the transmit error counter is increased when a transmission error is detected according to the CAN bus definitions.

The bits injected during each iteration are selected to override existing data on CAN bus network 206 and/or generate error(s) by malicious ECU 204, preventing malicious ECU 204 from transmitting additional instances of the malicious message over CAN bus network 206, before malicious ECU 204 is actually disabled.

The predefined number of errors generated by malicious ECU 204 that are triggered by the bits injected by computing device 202 is computed according to the error threshold value divided by amount of increase of the transmit error count value in response to generating a single error. For example, based on the CAN bus definitions, when the error threshold value is 255, and the transmit error count value is increased by 8 in response to each generated error, the predefined number of errors for generation is 32 (i.e., 255 divided by 8, rounded up).

At 112, malicious ECU 204 is disabled when the value of the error count rises above the threshold, for example, malicious ECU 204 enters the BUS OFF state according to the CAN bus definitions. The disabled malicious ECU 204 is prevented from transmitting data over CAN bus network 206.

At 114, an indication of the detection and/or disabling of the malicious ECU is generated, and may be displayed, stored, and/or forwarded to a remote server. For example, a message may be presented on a display on the dashboard of the vehicle alerting the user that a malicious ECU is disabled and to visit a garage of the vehicle manufacturer for investigation, a record of the malicious message may be stored in a local safe memory for further investigation, and/or a message may be transmitted to a remote monitoring server for further investigation and management.

When the malicious ECU represents a critical component of the vehicle operation, a back-up process may be triggered to enable safe driving and/or allow the vehicle to be safely stopped.

Figure 3:
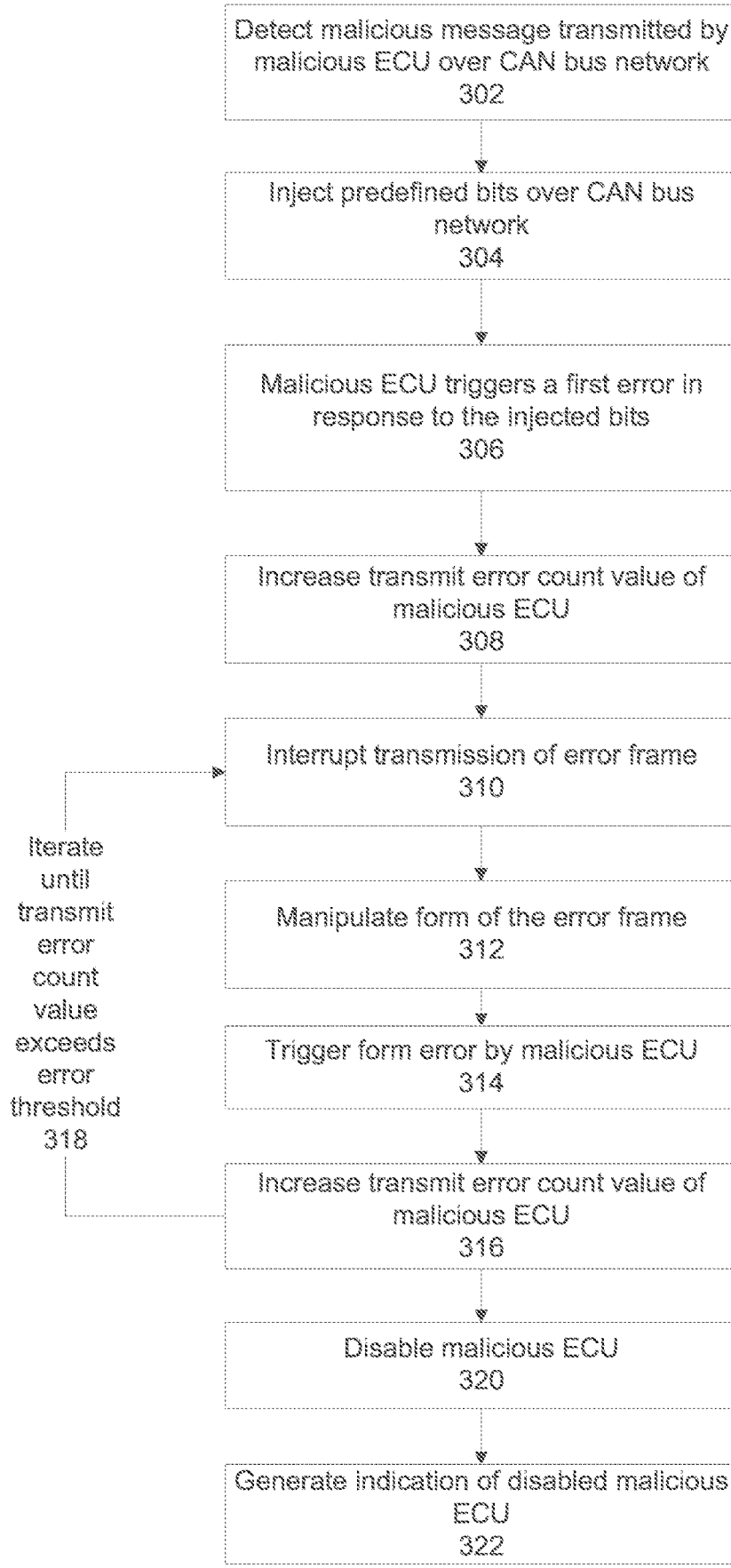
FIG. 3 is a flowchart of an exemplary implementation of a method of disabling a malicious ECU, in accordance with some embodiments.

Reference is now made to FIG. 3, which is a flowchart of an exemplary implementation of a method of disabling a malicious ECU, in accordance with some embodiments. The method described with reference to FIG. 3 is based on the method described with reference to FIG. 1, and/or implemented by system 200 described with reference to FIG. 2. The method described with reference to FIG. 3 is based on triggering multiple form errors in cascading error frames transmitted by the malicious ECU. FIG. 3 denotes an implementation where the predefined number of errors are generated as multiple injection sessions. Each bit injection session is triggered in response to detection of an additional error flag.

Optionally, the method described with reference to FIG. 3 may be based on a certain exemplary implementation of the set-of-rules defining the target data state of the CAN bus network.

At 302, the malicious message is detected, for example, as described with reference to act 102 of FIG. 1.

At 304, a predefined sequence of bits is injected by computing device 202 to trigger a first error in the malicious ECU 204, for example, as described with reference to act 104 of FIG. 1.

Optionally, 6 dominant bits are injected to trigger a stuffing error by malicious ECU 204.

At 306, the injected bits received by malicious ECU 204 trigger the first error, optionally the stuffing error, by malicious ECU 204, and transmission of a first error flag by malicious ECU 204. The first error flag is transmitted as part of a definition of an error frame, where the error frame includes an error flag field (e.g., 6 bits) followed by an error delimiter (e.g., 8 bits) that is expected to include recessive bits (e.g., 1's).

At 308, the current transmit error count value stored by transmit error counter(s) 204A of malicious ECU 204 is increased accordingly in response to the transmission of the first error flag.

At 310, the transmission of the error frame by malicious ECU 204 is interrupted by computing device 202. The transmission may be especially interrupted when recessive bits are being transmitted, as such recessive bits may be overridden by injected dominant bits.

At 312, computing device 202 manipulates the form of the error frame transmitted by malicious ECU 204.

The manipulation of the form of the error frame may be performed by transmitting one or more dominant bits (optionally a single bit) in place of the expected one or more recessive bits (optionally the second recessive bit, optionally at least the second recessive bit) of the error delimiter field of the error frame. As discussed, based on the CAN bus definitions, dominant bits override recessive bits.

At 314, the manipulated form of the error frame is detected by malicious ECU 204 and triggers a form error by malicious ECU 204.

At 316, the current transmit error count value stored by transmit error counter(s) 204A of malicious ECU 204 is increased accordingly in response to the transmission of the form, optionally an increase of 8 according to the CAN bus definitions.

At 318, acts 310-316 are iterated to interrupt the generated error frame, manipulate the form of the error frame, trigger another transmission of another form error by malicious ECU 204, and increase the transmit error count value of malicious ECU 204 in response to the transmitted form error.

The iteration is performed to generate the predefined number of errors for disabling malicious ECU 204. The iteration is performed to increase the transmit error count value above an error threshold value.

Optionally, the last iteration is performed without the manipulating the form of the error frame (act 312).

For example when the initial transmit error counter value is 0, the error threshold value is 255, and each iteration increased the value of the transmit error counter by 8, 30 iterations are performed in addition to the first bit stuff error for a total of 31 errors. The $32^{nd}$ error frame is transmitted without manipulation of the delimiter.

In terms of number of bits transmitted over the CAN bus, which impacts the total time for execution, in a best case scenario where the mitigation starts right after the RTR bit, a total of 278 bits are transmitted according to the CAN bus definitions. It is noted that actual results may vary. The breakdown is as follows: start of frame (1 dominant bit)+ID (11 bits)+RTR (1 recessive bit)+31*[error flag (6 dominant bits)+partial error delimiter (2 bits)]+error frame (14 bits)+intermission (3 recessive bits), where in terms of number of bits: 1+11+1+8*31+14+3=278.

At 320, malicious ECU 204 is disabled, for example, as described with reference to act 112 of FIG. 1.

At 322, an indication of the disabling of malicious ECU 204 is generated, for example, as described with reference to act 114 of FIG. 1.

Figure 4:
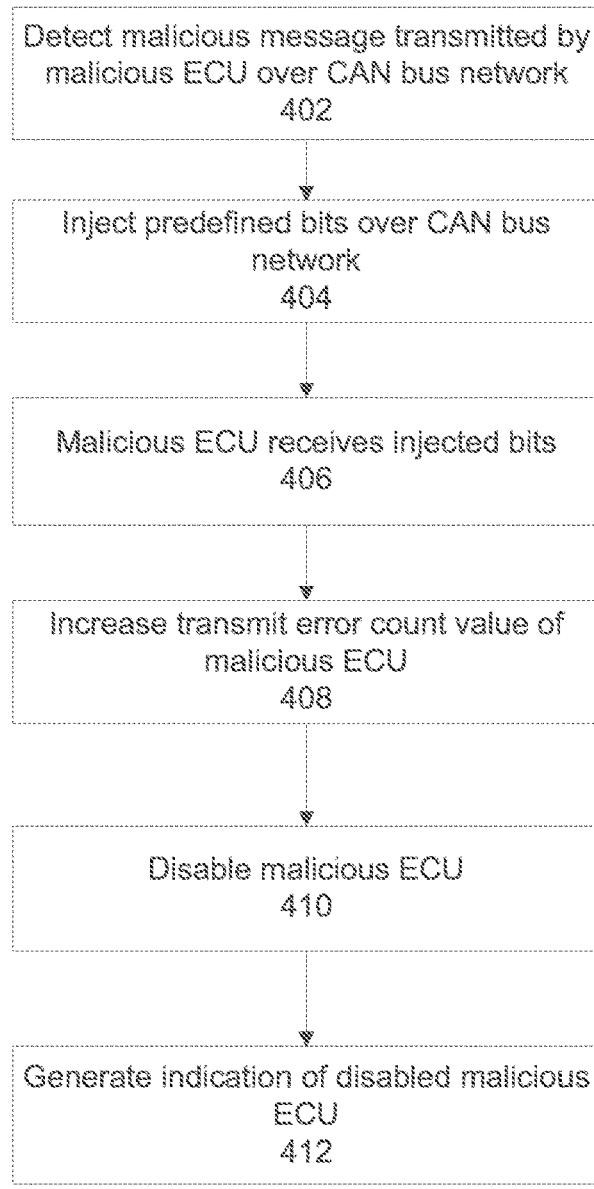
FIG. 4 is a flowchart of another exemplary implementation of a method of disabling a malicious ECU, in accordance with some embodiments.

Reference is now made to FIG. 4, which is a flowchart of another exemplary implementation of a method of disabling a malicious ECU, in accordance with some embodiments. The method described with reference to FIG. 4 is based on the method described with reference to FIG. 1, and/or implemented by system 200 described with reference to FIG. 2. The method described with reference to FIG. 4 is based on injection of a selected sequence of bits.

Optionally, the method described with reference to FIG. 4 may be based on another exemplary implementation of the set-of-rules defining the target data state of the CAN bus network.

The method described with reference to FIG. 4 is performed by computing device 202, without necessarily being based on an iteration and/or feedback according to error messages transmitted by malicious ECU 204, and/or without necessarily being based on manipulation of data transmitted by malicious ECU 204. FIG. 4 denotes injection of bits in a single session as a consecutive streaming of dominant bits.

At 402, the malicious message is detected, for example, as described with reference to act 102 of FIG. 1.

At 404, a predefined sequence of bits is injected by computing device 202, for example, as described with reference to act 104 of FIG. 1.

A first predefined number of consecutive dominant bits (optionally 14) are injected, followed by a second predefined number of consecutive sets (optionally 31) each of a third predefined number of dominant bits (optionally 8), followed by a fourth predefined number of valid bits of a recessive delimiter (optionally 8) and a fifth predefined number of recessive bit intermission (optionally 3).

At 406, the predefined sequence of bits is received by malicious ECU 204.

The first predefined number of consecutive dominant bits are detected by malicious ECU 204 as an active error flag, or after malicious ECU 204 detects a sixth predefined number of consecutive dominant bits following a passive error flag. The sixth predefined number of consecutive dominant bits denotes the 8th consecutive dominant bit following the passive error flag.

At 408, the transmit error count value stored by transmit error counter 204A of malicious ECU 204 is increased above the error threshold. According to CAN bus definitions, from an initial value of 0 to 256, which is above the error threshold of 255, for example, as described with reference to act 108 of FIG. 1.

The transmit error count value is increased in response to malicious ECU 204 detecting the first predefined number of consecutive dominant bits (optionally by 8), and in response to malicious ECU 204 detecting each sequence of the second predefined number of the additional third predefined number of consecutive dominant bits (optionally by 8 for each detected sequence).

In terms of number of bits transmitted over the CAN bus, which impacts the total time for execution, a total of 286 bits are transmitted according to the CAN bus definitions. The breakdown is as follows: start of frame (1 dominant bit)+ID (11 bits)+RTR (1 recessive bit)+31*[8 dominant bits]+valid recessive delimiter (8 recessive bits)+intermission (3 recessive bits), where in terms of number of bits: 1+11+1+8*31+ 8+3=286.

At 410, malicious ECU 204 is disabled, for example, as described with reference to act 112 of FIG. 1.

At 412, an indication of the disabling of malicious ECU 204 is generated, for example, as described with reference to act 114 of FIG. 1.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant ECUs and CAN bus networks will be developed and the scope of the terms ECU and CAN bus network is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of the embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art. To the extent that section headings are used, they should not be construed as necessarily limiting.

The invention claimed is:

1. A system for disabling a malicious electronic control unit (ECU) of a plurality of ECUs in communication with a controller area network (CAN) bus network, comprising:
    a non-transitory memory having stored thereon a code for execution by at least one hardware processor of a computing device in communication with the plurality of ECUs and the CAN bus network, the code comprising:
        code instructions for detecting a malicious message transmitted by the malicious ECU over the CAN bus network; and
        code instructions for injecting a plurality of bits over the CAN bus network to trigger a predefined plurality of errors for disabling the malicious ECU before the malicious ECU makes an additional attempt to retransmit an additional instance of the malicious message,
    wherein the predefined number of the plurality of errors are triggered by a plurality of injection sessions, wherein each bit injection session is triggered in response to detection of an additional error, and
    wherein a first injection session of the plurality of injection sessions comprises injecting bits to trigger a first error and transmission of a first error flag, wherein a current error count value stored by at least one error counter of the malicious ECU is increased by the transmission of the first error flag;

the code further comprising:
    code instructions for interrupting the error frame storing the first error flag and injecting bits as an additional bit injection session for manipulating the form of the error frame to trigger a form error, wherein the form error triggers transmission of another error flag which triggers another increase of the current error count value stored by the at least one error counter of the malicious ECU;
    code instructions for iterating the interrupting of an additional error frame and the injection of bits as an additional bit injection session for manipulating the form of the error frame, to trigger at each iteration the transmission of a form error form and a respective increase of the current error count value,
    wherein the number of iterations are performed accordingly to generate the predefined number of the plurality of errors for disabling the malicious ECU.

2. The system of claim 1, wherein a current error count value stored by at least one error counter of the malicious ECU is increased above an error threshold denoting disabling of the malicious ECU in response to the triggered predefined plurality of errors.

3. The system of claim 2, wherein a difference between the current error count value and the error threshold is greater than the value by which the error counter increases the current error count value in response to a single generated error.

4. The system of claim 2, wherein the predefined number of the plurality of errors is computed according to the error threshold value divided by amount of increase of the current error count value in response to generating a single error.

5. The system of claim 2, wherein the predefined number of the plurality of errors is 32 when the error threshold value is 255 and when the current transmit error count value is increased by 8 in response to generating a single error.

6. The system of claim 1, wherein the injected bits are designed to trigger one or more of the following errors, selected from the group consisting of: bit stuffing, bit error, cyclic redundancy check (CRC), monitoring, frame, and acknowledgement errors.

7. The system of claim 1, wherein manipulating the form of the error frame comprises transmitting a single dominant bit in place of the expected at least one recessive bit of an error delimiter field of the error frame.

8. The system of claim 1, wherein the last iteration of the interrupting the error frame is performed without the manipulating the form of the error frame.

9. A computer program product for disabling a malicious electronic control unit (ECU) of a plurality of ECUs in communication with a controller area network (CAN) bus network, comprising:
    a non-transitory memory having stored thereon a code for execution by at least one hardware processor of a computing device in communication with the plurality of ECUs and the CAN bus network, the code comprising:
        instructions for detecting a malicious message transmitted by the malicious ECU over the CAN bus network; and
        instructions for injecting a plurality of bits over the CAN bus network to trigger a predefined plurality of errors for disabling the malicious ECU before the malicious ECU makes an additional attempt to retransmit an additional instance of the malicious message,
        wherein the predefined number of the plurality of errors are triggered by a plurality of injection sessions, wherein each bit injection session is triggered in response to detection of an additional error, and
        wherein a first injection session of the plurality of injection sessions comprises injecting bits to trigger a first error and transmission of a first error flag, wherein a current error count value stored by at least one error counter of the malicious ECU is increased by the transmission of the first error flag;
    the code further comprising:
        instructions for interrupting the error frame storing the first error flag and injecting bits as an additional bit injection session for manipulating the form of the error frame to trigger a form error, wherein the form error triggers transmission of another error flag which triggers another increase of the current error count value stored by the at least one error counter of the malicious ECU;
        instructions for iterating the interrupting of an additional error frame and the injection of bits as an additional bit injection session for manipulating the form of the error frame, to trigger at each iteration the transmission of a form error form and a respective increase of the current error count value,
    wherein the number of iterations are performed accordingly to generate the predefined number of the plurality of errors for disabling the malicious ECU.

10. The computer program product of claim 9, wherein a current error count value stored by at least one error counter of the malicious ECU is increased above an error threshold denoting disabling of the malicious ECU in response to the triggered predefined plurality of errors.

11. The computer program product of claim 10, wherein a difference between the current error count value and the error threshold is greater than the value by which the error counter increases the current error count value in response to a single generated error.

12. The computer program product of claim 10, wherein the predefined number of the plurality of errors is computed according to the error threshold value divided by amount of increase of the current error count value in response to generating a single error.

13. The computer program product of claim 10, wherein the predefined number of the plurality of errors is 32 when the error threshold value is 255 and when the current transmit error count value is increased by 8 in response to generating a single error.

14. The computer program product of claim 9, wherein the injected bits are designed to trigger one or more of the following errors, selected from the group consisting of: bit stuffing, bit error, cyclic redundancy check (CRC), monitoring, frame, and acknowledgement errors.

15. The computer program product of claim 9, wherein manipulating the form of the error frame comprises transmitting a single dominant bit in place of the expected at least one recessive bit of an error delimiter field of the error frame.

16. The computer program product of claim 9, wherein the last iteration of the interrupting the error frame is performed without the manipulating the form of the error frame.

* * * * *